United States Patent [19]
Mower

[11] Patent Number: 5,382,265
[45] Date of Patent: Jan. 17, 1995

[54] PERCHLORATE REMOVAL PROCESS

[75] Inventor: Glenn L. Mower, Mt. Sterling, Utah

[73] Assignee: Thiokol Corporation, Odgen, Utah

[21] Appl. No.: 143,190

[22] Filed: Oct. 26, 1993

[51] Int. Cl.$^6$ .............. C01D 13/00; A67D 3/00
[52] U.S. Cl. .................... 23/302 R; 23/300;
23/302 A; 149/124; 588/202; 423/476
[58] Field of Search ............ 423/476; 149/124;
588/202, 203; 23/300, 302 R, 302 A

[56] References Cited

U.S. PATENT DOCUMENTS

| | | | |
|---|---|---|---|
| 2,972,514 | 2/1961 | Ritchey | 423/476 |
| 2,998,299 | 8/1961 | Cecil et al. | 423/476 |
| 3,102,784 | 9/1963 | Gale | 423/476 |
| 3,383,180 | 5/1968 | Kralik et al. | 423/476 |
| 3,451,789 | 6/1969 | McIntosh | 149/124 |
| 3,943,055 | 3/1976 | Korenkov et al. | 210/2 |
| 4,198,209 | 4/1980 | Shaw et al. | 588/202 |
| 4,333,737 | 6/1982 | Montgomery | 149/124 |
| 4,793,866 | 12/1988 | McIntosh | 134/24 |
| 4,854,982 | 8/1989 | Melvin et al. | 149/109.6 |

FOREIGN PATENT DOCUMENTS 636568  2/1962  Canada .
327768  6/1977  U.S.S.R. .

*Primary Examiner*—Gary P. Straub
*Attorney, Agent, or Firm*—Madson & Metcalf

[57] ABSTRACT

A process for removing perchlorate ion from waste water using KCl is disclosed. In the process, waste perchlorate is concentrated by water evaporation in a stripping tower. Ammonia and volatile organics are removed during the concentrating step. Potassium chloride (KCl) is added to the concentrated perchlorate solution to form potassium perchlorate (KClO$_4$), and the reaction mixture is cooled to effect crystallization of the potassium perchlorate. The crystallization liquor is removed by centrifuge or filter press and may be further treated as part of an overall waste water treatment system.

16 Claims, No Drawings

PERCHLORATE REMOVAL PROCESS

BACKGROUND OF THE INVENTION

1. Field of the Invention

This invention relates to water treatment processes. More particularly, the present invention is directed to a process for removing perchlorate ions from waste water.

2. Technology Background

Ammonium perchlorate (abbreviated "AP", having the chemical formula $NH_4ClO_4$) is a common waste stream ingredient in the processing and reclamation of solid rocket propellants. Because solid rocket motors often include 60% AP, water used to wash and clean rocket motor processing facilities and equipment typically contain up to about 100,000 parts-per-million (ppm) AP.

There are three approaches that have been used in the industry for disposing of waste streams containing AP. In the first approach, the waste water is treated to remove high energy materials, such as NG, HMX or RDX, and the waste stream is discharged for treatment by a municipal or privately owned water treatment facility. The perchlorate is not treated but is diluted. In the another approach, a third party, such as a slurry explosive company, is paid to evaporate the water from the waste stream leaving a concentrated AP slurry capable of use as in the mining industry as a slurried explosive. There is also a patented bio-digestion process for low level treatment of AP. There still remains a need in the art for a process of removing AP from waste streams.

Applicant is aware of an unpublished a process of treating waste streams containing AP in concentrations exceeding 10,000 ppm. The treatment chemistry is shown below:

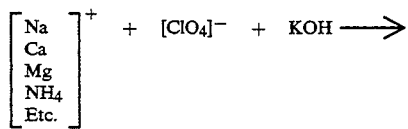

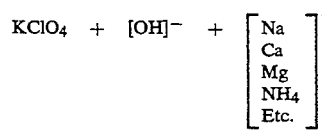

In the process, waste perchlorate is concentrated by water evaporation. During the concentrating step, ammonia and volatile organics are also removed. Potassium hydroxide (KOH) is added to the perchlorate salts which converts the perchlorate to potassium perchlorate ($KClO_4$).

To prevent the potassium perchlorate from crystallizing prematurely, it is necessary to keep the concentrated mixture at an elevated temperature until it reaches the crystallizers. Once in the crystallizers, the reaction mixture is cooled and the potassium perchlorate precipitates from solution. The precipitated potassium perchlorate is dewatered, and the crystallizing liquor is routed for further treatment.

KOH is a preferred reactant in this process because the hydroxide counterion does not further contaminate the reaction stream, but forms water. The high pH resulting from the hydroxide ions also facilitates ammonia removal. Finally, being a liquid, KOH is easier to handle than a solid because it can be pumped.

Although effective for its intended purpose, there are significant disadvantages with the above-described perchlorate removal process. For instance, concentrated KOH (pH=14) is hazardous and corrodes process equipment and pipes. Even after removal of precipitated $KClO_4$, remaining hydroxide ions in the waste water and on the $KClO_4$ crystals must be neutralized with acid. Until neutralization is completed, the high pH solutions pose a personnel safety issue. Moreover, concentrating the perchlorate is an important step in the process, but because KOH used in the process is liquid, with a maximum concentration of 40% dilution of the perchlorate solution occurs when the KOH is added. This dilution results in more waste water to be processed and a lower yield of $KClO_4$.

From the foregoing, it will be appreciated that there is a need in the art for a perchlorate ion removal process which is not hazardous or corrosive and which does not require pH neutralization. It would also be a significant advancement in the art to provide a perchlorate ion removal process which does not dilute the perchlorate solution, but results in high perchlorate yield.

Such a process for removing perchlorate ion from waste water is disclosed and claimed herein.

SUMMARY OF THE INVENTION

The invention is directed to a process for removing perchlorate ion from waste water. In the process of the present invention, waste perchlorate is concentrated by water evaporation, preferably in a stripping tower. During the concentrating step, ammonia and volatile organics are also removed. Solid potassium chloride (KCl) is then added, and the reaction mixture is cooled to effect crystallization of potassium perchlorate ($KClO_4$). The crystallization liquor is removed by centrifuge or filter press and may be further treated as part of an overall waste water treatment system. The treatment chemistry is shown below:

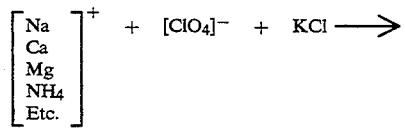

DETAILED DESCRIPTION OF THE INVENTION

The present invention is directed to a process for removing perchlorate ion from waste water. In the process of the present invention, waste perchlorate is concentrated by water evaporation. Stripping towers and thin film evaporators are two possible devices for concentrating the waste perchlorate stream. The currently preferred method of concentrating the waste perchlorate stream is the use of a stripping tower. The use of the stripping tower facilitates the removal of ammonia. Stripping towers and their operation are well known to those skilled in the art. The size and capacity of the stripping tower used will depend on the quantity of waste perchlorate that must be processed.

In general, stripping towers are filled with packing which creates a large surface area within the tower. The heated fluid is introduced at the top of the tower, usually by spraying. As the fluid flows over the packing material, air is blown up from the bottom of the tower. Air blowing from the bottom of the tower drives off ammonia and evaporates water.

It is important that the water temperature and flow rate be balanced against the air flow rate to prevent flashing or drying within the tower. In the present case, the perchlorate waste stream is heated to a temperature greater than 150° F., preferably greater than 200° F., and most preferably about 240° F. The higher the temperature, the faster the evaporation and the more soluble is the KCl. For a typical tower size of 4 feet × 6 feet, a water flow rate of about 60 gallons/minute at 240° F. balances an air flow rate of about 3000 cubic feet/minute.

Concentrated waste perchlorate from the stripping tower passes into a reactor vessel. Potassium chloride (KCl) is then added to the hot concentrated waste perchlorate. The amount of KCl added depends upon the concentration of the waste perchlorate. A stoichiometric excess of KCl is preferred; however, too much excess KCl results in additional potassium and chloride ions which ultimately must be accounted for in the waste stream. It is currently preferred that the perchlorate concentration be reduced from about 250,000 to 100,000 ppm to a level below 6000 ppm. To achieve this end concentration, a stoichiometric excess of 2 KCl is added to the waste perchlorate.

Once the KCl is added, potassium perchlorate ($KClO_4$) immediately begins to precipitate. Since the solubility of potassium perchlorate is temperature dependent, the reaction mixture is preferably cooled to cause the maximum crystallization of potassium perchlorate. Best results have been observed when the crystallizer temperature is maintained below about 60° F. and preferably below 40° F.

A waste perchlorate slurry passes from the reactor vessel to a crystal dewatering unit. The dewatering device is a centrifuge, filter press or another filtration device. Such dewatering devices are well known in the art. The crystallization liquor may be further treated as part of an overall waste water treatment system to remove ammonia, heavy metals, organic, suspended solids and or other waste materials.

The chemical reaction governing the treatment process of the present invention is shown below:

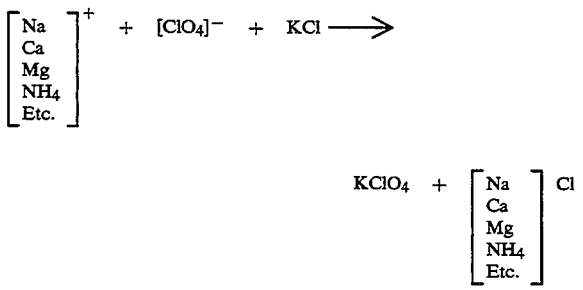

There are important advantages one obtains using KCl in the perchlorate removal process. For instance, KCl is relatively noncorrosive, nontoxic, nonhazardous, and easy to work with. No acid neutralization or pH modification is required. KCl is a granular solid much like table salt which can be added directly without dilution of the concentrated perchlorate solution. This is more efficient and results in a higher yield of $KClO_4$.

Since the addition of KCl does not affect the pH of the solution, it can be added until the desired level of perchlorate concentration is reached, without the corrosion problem associated with high pH levels. The ability to drive the precipitation reaction to lower residual perchlorate levels using KCl is a significant advantage over the use of KOH. The amount of KCl required to obtain a desired level of perchlorate concentration is presented in Equation 1.

$ClO_4$ Concentration (ppm)* $8.3 \times 10^{-6}$ = pounds KCl  Eq. 1

The following is an example of a typical operation cycle.

Feed Stream $ClO_4$ concentration = 17060 ppm
Gallons concentrated = 1750
Time to concentrate = 9.2 hrs
Gallons concentrated solution reacted = 150 gals
Pounds of KCl add = 242 lbs.
Pounds of KP (moist) produced = 325 lbs
Filter press filtrate $ClO_4$ concentration = 333 ppm From the foregoing it will be appreciated that the present invention provides a perchlorate ion removal process which is not hazardous or corrosive and which does not require pH neutralization. The present invention further provides a perchlorate ion removal process which does not dilute the perchlorate solution, but results in high perchlorate yield. The process also lends itself to the removal of ammonia from the stream.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A process for removing ammonium perchlorate from waste water comprising:
   (a) concentrating a waste ammonium perchlorate solution;
   (b) adding granular solid potassium chloride (KCl) to the concentrated waste perchlorate solution to form potassium perchlorate ($KClO_4$);
   (c) effecting crystallization of the potassium perchlorate in the resulting solution; and
   (d) separating the crystallized potassium perchlorate from the resulting solution.

2. A process for removing ammonium perchlorate as defined in claim 1, wherein the waste ammonium perchlorate solution is concentrated by water evaporation.

3. A process for removing ammonium perchlorate as defined in claim 1, wherein the concentrating step further includes the step of removing ammonia and volatile organics from the waste ammonium perchlorate solution.

4. A process for removing ammonium perchlorate as defined in claim 1, wherein the concentrating step is accomplished by heating the waste ammonium perchlorate solution.

5. A process for removing ammonium perchlorate as defined in claim 4, wherein the concentrating step is accomplished in a stripping tower with a liquid inlet temperature maintained above about 150° F.

6. A process for removing ammonium perchlorate as defined in claim 4, wherein the concentrating step is accomplished in a stripping tower with a liquid inlet temperature maintained above about 200° F.

7. A process for removing ammonium perchlorate as defined in claim 4, wherein the waste perchlorate solution is cooled to effect crystallization of the potassium perchlorate.

8. A process for removing ammonium perchlorate as defined in claim 7, wherein the waste perchlorate solution is maintained at a temperature below about 60° F. during the crystallization of the potassium perchlorate.

9. A process for removing ammonium perchlorate as defined in claim 7, wherein the waste perchlorate solution is maintained at a temperature below about 40° F. during the crystallization of the potassium perchlorate.

10. A process for removing ammonium perchlorate as defined in claim 1, wherein the crystallized potassium perchlorate is separated from the waste perchlorate solution by centrifugation.

11. A process for removing ammonium perchlorate as defined in claim 1, wherein the crystallized potassium perchlorate is separated from the waste perchlorate solution by filter press.

12. A process for removing ammonium perchlorate from waste water comprising:

(a) concentrating a waste ammonium perchlorate solution by water evaporation in a stripping tower, wherein the waste perchlorate solution is heated to an inlet temperature greater than about 150° F. and wherein ammonia and volatile organics are removed from the waste perchlorate solution during the concentrating step;

(c) adding granular solid potassium chloride (KCl) to the hot concentrated waste perchlorate solution to form potassium perchlorate ($KClO_4$);

(d) cooling the solution to a temperature below about 60° F. to effect crystallization of the potassium perchlorate; and (e) separating the crystallized potassium perchlorate from the cooled solution.

13. A process for removing ammonium perchlorate as defined in claim 12, wherein the crystallized potassium perchlorate is separated from the waste perchlorate solution by centrifugation.

14. A process for removing ammonium perchlorate as defined in claim 12, wherein the crystallized potassium perchlorate is separated from the waste perchlorate solution by filter press.

15. A process for removing ammonium perchlorate as defined in claim 12, wherein the waste perchlorate solution is heated to an inlet temperature greater than about 200° F.

16. A process for removing ammonium perchlorate as defined in claim 12, wherein the waste perchlorate solution is maintained at a temperature below about 40° F. during the crystallization of the potassium perchlorate.

* * * * *